US012440850B2

(12) United States Patent
Heim et al.

(10) Patent No.: US 12,440,850 B2
(45) Date of Patent: Oct. 14, 2025

(54) VIBRATION MEASURING ASSEMBLY

(71) Applicant: Voith Patent GmbH, Heidenheim (DE)

(72) Inventors: Martin Heim, Ravensburg (DE); Adrian Honig, Ravensburg (DE)

(73) Assignee: Voith Patent GmbH, Heidenheim (DE)

( * ) Notice: Subject to any disclaimer, the term of this patent is extended or adjusted under 35 U.S.C. 154(b) by 309 days.

(21) Appl. No.: 18/115,403

(22) Filed: Feb. 28, 2023

(65) Prior Publication Data

US 2023/0213405 A1 Jul. 6, 2023

Related U.S. Application Data

(63) Continuation of application No. PCT/EP2021/073464, filed on Aug. 25, 2021.

(30) Foreign Application Priority Data

Aug. 28, 2020 (DE) ...................... 10 2020 122 533.4

(51) Int. Cl.
*B02C 7/14* (2006.01)
*D21B 1/14* (2006.01)
(Continued)

(52) U.S. Cl.
CPC ................ *B02C 7/14* (2013.01); *D21D 1/20* (2013.01); *D21D 1/30* (2013.01); *D21B 1/14* (2013.01); *G01M 1/22* (2013.01)

(58) Field of Classification Search
CPC .. B02C 7/11; B02C 7/14; B02C 7/186; D21D 1/006; D21D 1/30; D21D 1/303
See application file for complete search history.

(56) References Cited

U.S. PATENT DOCUMENTS

| 4,233,600 | A | 11/1980 | Rogers et al. | |
|---|---|---|---|---|
| 2007/0125891 | A1* | 6/2007 | Crossley | D21D 1/30 241/30 |

(Continued)

FOREIGN PATENT DOCUMENTS

| CN | 109296506 A | * | 2/2019 | ............... F03D 7/00 |
|---|---|---|---|---|
| DE | 696 06 621 T2 | | 6/2000 | |

(Continued)

OTHER PUBLICATIONS

Notification of the Transmission of the International Search Report and Written Opinion of the International Search Authority or Declaration dated Dec. 10, 2021 for International Application No. PCT/EP2021/073464 (12 pages).

*Primary Examiner* — Jared O Brown
(74) *Attorney, Agent, or Firm* — TAYLOR & EDELSTEIN, PC

(57) ABSTRACT

A device for treating a web of fibrous material, the device comprising: a sensor for detecting vibrations; a multi-part housing including a cover; and a plurality of fiber treatment tools arranged inside the multi-part housing, the plurality of fiber treatment tools including a plurality of treatment profiles facing one another, being arranged spaced apart from each other so as to form at least one treatment gap with the plurality of treatment profiles, and being mounted rotatably relative to one another, at least one of the plurality of fiber treatment tools being mounted axially movable in the multi-part housing so as to be configured for adjusting a width of the at least one treatment gap between the plurality of treatment profiles facing each other, at least one of the plurality of fiber treatment tools being supported by a part of the multi-part housing, the sensor being arranged on the multi-part housing.

19 Claims, 2 Drawing Sheets

(51) Int. Cl.
*D21D 1/20* (2006.01)
*D21D 1/30* (2006.01)
*G01M 1/22* (2006.01)

(56) References Cited

U.S. PATENT DOCUMENTS

2019/0243334 A1* 8/2019 Hedin ............... G01H 17/00
2020/0246801 A1* 8/2020 Singhal ............ D21D 1/306

FOREIGN PATENT DOCUMENTS

| EP | 0 792 689 A1 | 9/1997 | | |
|----|----|----|----|----|
| JP | 2003-112069 A | 4/2003 | | |
| WO | WO-8606770 A1 | * | 11/1986 | ............ D21D 1/002 |
| WO | WO-9110904 A1 | * | 7/1991 | ............ G01N 33/46 |
| WO | WO-2015136815 A1 | * | 9/2015 | ............ B02C 7/14 |

* cited by examiner

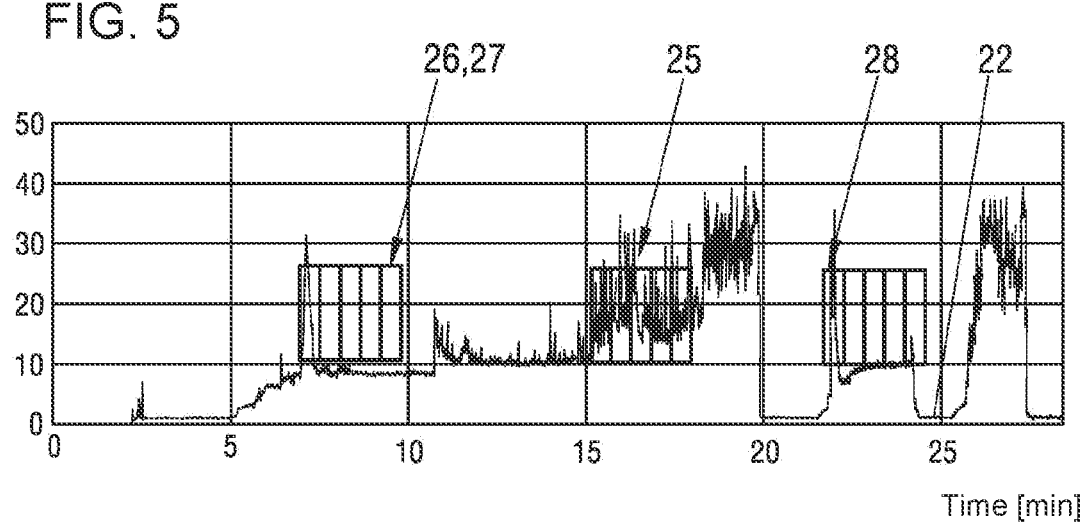
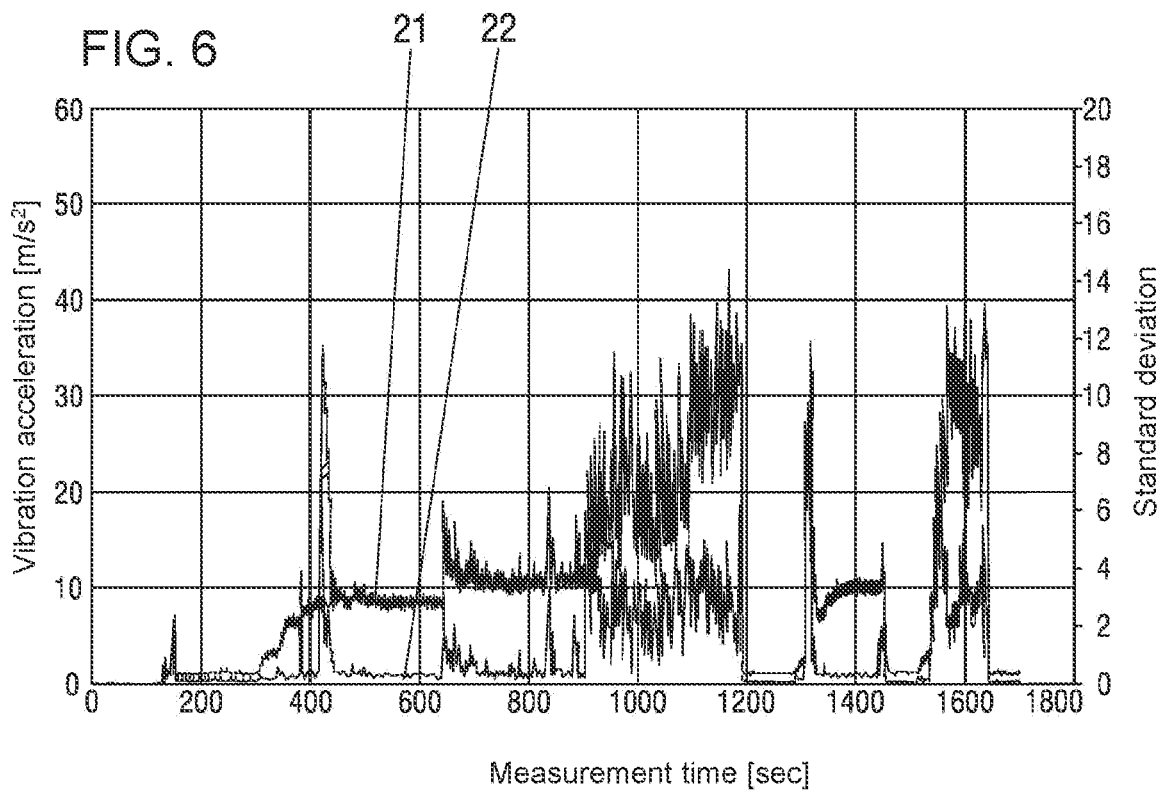

VIBRATION MEASURING ASSEMBLY

CROSS REFERENCE TO RELATED APPLICATIONS

This is a continuation of PCT application no. PCT/EP2021/073464, entitled "VIBRATION MEASURING ASSEMBLY", filed Aug. 25, 2021, which is incorporated herein by reference. PCT application no. PCT/EP2021/073464 claims priority to German patent application no. DE 10 2020 122 533.4, filed Aug. 28, 2020, which is incorporated herein by reference.

BACKGROUND OF THE INVENTION

1. Field of the Invention

The present invention relates to a device for treatment of fibrous material, including a sensor for detection of vibrations. The device has a multipart housing. The housing includes a cover. The device moreover includes fiber treatment tools, wherein the fiber treatment tools are arranged spaced apart from each other to form at least one treatment gap with treatment profiles facing each other and are mounted rotatably relative to each other. At least one treatment tool is mounted axially movable for adjusting a width of the at least one treatment gap between the treatment profiles facing each other. At least one of the treatment tools is supported by a housing part.

2. Description of the Related Art

The treatment tools normally have a rotationally symmetrical shape and are arranged coaxially to one another. Two treatment tools define a treatment gap through which the fibrous material flows radially, and the treatment tools each have a treatment profile facing the treatment gap. If several treatment gaps are provided it may be provided that at least one treatment tool is mounted in an axially floating manner.

A refiner for the treatment of a fibrous suspension used in paper manufacturing is known from US 2007/0125891. This refiner includes a vibration sensor by way of which contact with the treatment tools is detected. The sensor is arranged inside the refiner on a support of a stationary treatment tool. The sensor recognizes axial vibration movements. The axial vibration movements can be indicative of a contact between the treatment tools. Two vibration sensors may also be provided, each arranged on a stationary support of a treatment tool.

EP 792689 B1 describes a refiner and a method for attaching or detaching refiner disks. The refiner has a shredding chamber. The shredding chamber includes a main section. The main section is closed by a cover. The cover is connected to the main section via a hinge and can be opened, whereby in the open position the cover is supported via the hinge.

With devices such as refiners, dispergers, deflakers, it is possible—although the relatively movable treatment tools do not touch each other—to achieve mechanical processing of the fibrous material, with the treatment tools moving past each other at a small distance. The intensity of the treatment depends on the one hand on the gap width between the surfaces of the treatment tools and on the other hand on the consistency of the fibrous material. Increasing intensity of the treatment results in wear and tear of the treatment tools.

Devices of the aforementioned type are used for example to increase the quality of pulp, TMP or fibrous material produced from waste paper.

If the height of the treatment profile of the treatment tools is reduced due to wear, the resulting enlarged treatment gap leads to a reduction in the no-load power or respectively the pumping power. With a constant overall performance, this leads simultaneously to an increase in the relevant specific efficiency for the targeted treatment intensity of the device and thus to excessive treatment, in particular refining of the fibers.

In turn, if the gap is too small, there is a risk of excessive electrical current consumption and contact between the treatment tools.

Refining of cellulose fibers, that is primary and secondary fibers, has been known for a long time to be effective, in order to be able to achieve the desired properties in the fibrous web produced therefrom, especially in terms of strength, porosity, formation and surface.

In the refiners used for this purpose, the refining surfaces are provided by replaceable refining fillings which—because of the relatively rapid wear—are screwed to the corresponding base plate. In order to achieve the desired fiber characteristics, in particular the SR-value (Schopper-Riegler value), the refining fillings have to be adapted at the best possible rate to the fibers to be treated, also to prevent excessive wear of the fillings in addition to achieving an ideal fiber treatment.

Refiners may be in the embodiment of disc refiners or conical refiners.

To improve throughput, double gap arrangements are increasingly used. Due to the axially floating mounting of the rotor, no reliable statements can be made regarding the gap width and the condition of wear. Theoretically, identical gap widths should occur at a hydraulic equilibrium, however, practical experience has shown that different gap widths can occur during operation.

What is needed in the art is a device and a method by way of which high wear of refiner fillings due to contact between the treatment profiles during operation can be reduced.

What is also needed in the art is to minimize the wear of the treatment tools in these devices by the simplest possible way. Furthermore, what is also needed in the art is a method with which the wear of the treatment tools can be minimized.

SUMMARY OF THE INVENTION that the present invention provides that the sensor for detection of vibrations of the device is arranged on the housing of the device. The sensor is arranged optionally on the outside of the housing of the device. By arranging the sensor on the housing it is easily accessible. Because of this arrangement of the sensor, maintenance is simple, and easy replacement and simple retrofit are possible.

For the detection of vibrations which indicate contact between the treatment tools, it has proven advantageous to mount the sensor on a housing part which is supporting a treatment tool.

It has proven advantageous if a housing part is fixed and if at least the sensor is accommodated on or in the housing part, which can be pivoted away from it via the joint and which is referred to as the cover.

In order to detect conditions that increase wear and tear, the sensor should detect vibration acceleration and/or vibrations in the range between 4 and 12 kHz.

Particularly suitable for this purpose are sensors in the embodiment of uniaxial acceleration recorders, which are optionally aligned parallel to the axis of the device. This axis is also parallel to the width of the treatment gap if the treatment profiles are flat. If conical treatment profiles are provided, it has proven advantageous that the axis of the uniaxial acceleration recorder is aligned parallel to the width of the treatment gap. The width of the treatment gap extends perpendicular to the treatment surfaces. Uniaxial acceleration recorders are available inexpensively as a mass product.

The present invention is optionally used in devices in which there are two treatment gaps in the housing, and the two central treatment tools are mounted on a common rotating base plate which is axially floating. In addition to the optional refining, this is also possible in principle for deflaking or dispersion.

If a condition is detected which is critically susceptible to wear (contact of the treatment tools or insufficient fiber suspension cushion of a treatment gap), this condition can be easily eliminated if the axial position of at least one treatment tool of a housing part can be adjusted. Thus, increased wear can be easily countered by widening the treatment gap.

In one embodiment it is provided, that the cover of the housing is mounted rotatably about a joint axis. In particular, at least two hinges are provided. It has been found to be advantageous to mount the sensor in the area between the hinges on the housing, optionally on the cover. The area between the hinges is limited by planes perpendicular to the joint axis. If the joint axis extends vertically, the sensor is arranged in a horizontal region between the hinges.

In one embodiment, the sensor is provided on the hinge-side half of the cover.

A location between the hinges that extends parallel to the treatment gap has proven to be particularly suitable, with the sensor axis aligned in the direction of the gap width. In particular, this allows vibrations to be detected which are due to contact between the treatment profiles of the treatment tools.

It has shown to be advantageous to select a position for the sensor that has a rigidity so that high frequency parasitic vibrations are minimized.

With regard to the process, it is essential that the vibration intensity, in particular the vibration acceleration or the standard deviation of the vibration acceleration, is determined via a sensor in order to minimize wear in a device for treatment of fibers. The detected vibration signals are filtered by way of a high pass filter, in particular a high pass filter of at least 4000 Hz, optionally at least 5000 Hz. When an exceeded vibration threshold value—also referred to as a vibration peak—is detected, a determination of the vibrations, in particular the vibration acceleration over a predetermined number of time intervals, is made. If the vibration threshold value is exceeded for at least half of the time intervals, a malfunction is signaled.

In one optional embodiment it is provided that a measurement is conducted over a time interval of at least 2 seconds. In one embodiment it is provided that the time intervals extend over identical length.

In order to suppress brief contacts between the treatment tools caused by operational conditions, a contact between two treatment tools should only be assumed in the case of at least one vibration peak in each of at least two specified time intervals, optionally in at least three of at least five consecutive specified time intervals.

It has proven to be especially advantageous to use at least five consecutive time intervals. If a vibration peak is detected within 3 time intervals, a malfunction is signaled.

When evaluating the vibration, reliability can be improved in that basic vibrations in the environment of the device are being considered. For this purpose, it is provided that a basic value of operation-related vibrations is taught each time the device is started up. In this way, basic environment-related vibrations can be eliminated.

It has proven to be advantageous to continuously determine a standard deviation from the recorded vibration acceleration signals in order to determine the vibration intensity. The standard deviation can have lower values compared to a determined vibration acceleration if the machine is operated smoothly and under high load.

The present invention also relates to a method to minimize wear and tear on a device for treatment of fibrous material, wherein the device includes a multi-part housing in which at least one first treatment tool and one second treatment tool are arranged, wherein the treatment tools have a rotationally symmetrical shape, are arranged coaxially relative to each other, rotate relative to each other about a common axis; wherein two treatment tools respectively define a treatment gap through which the fibrous material flows, and wherein the treatment tools respectively have a treatment profile facing the treatment gap, wherein at least one treatment tool is mounted in an axially floating manner; wherein two housing parts, each of which support at least one treatment tool are coupled together via a joint which is rotatable about a joint axis, and wherein the device is equipped with at least one sensor.

BRIEF DESCRIPTION OF THE DRAWINGS

The above-mentioned and other features and advantages of this invention, and the manner of attaining them, will become more apparent and the invention will be better understood by reference to the following description of at least one embodiment of the invention taken in conjunction with the accompanying drawing, wherein:

FIG. 5 is a representation of the sensor data and the time interval method; and FIG. 6 is a recording of acceleration data in comparison to the standard deviation.

Corresponding reference characters indicate corresponding parts throughout the several views. The exemplification set out herein illustrate at least one embodiment of the invention, and such exemplifications are not to be construed as limiting the scope of the invention in any manner.

DETAILED DESCRIPTION OF THE INVENTION

Figure 4:
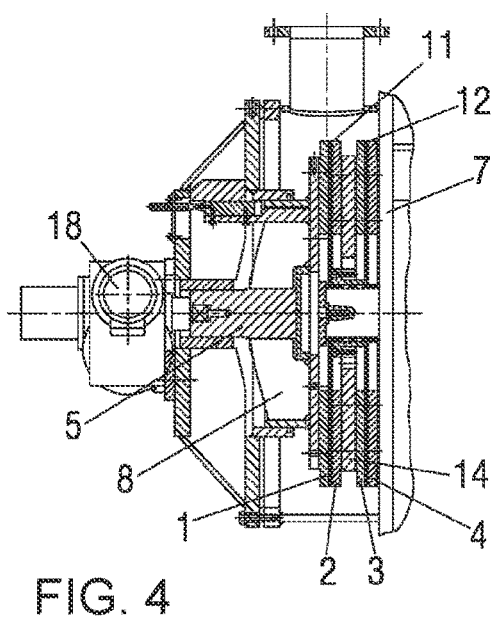
FIG. 4 is a schematic cross-section through the refiner.

The housing of the arrangement for refining fibrous material as shown in FIG. 4, includes two parallel treatment gaps 11, 12 extending perpendicular relative to axis of rotation 5, each formed by a non-rotating treatment tool 1, 4 and a flat treatment tool 2, 3 rotating about axis 5.

The annular treatment profile 10 of aforementioned treatment tools 1, 2, 3, 4 each facing treatment gap 11, 12, is formed by refining fillings having a plurality of substantially radially extending refining bars on the profile side, so that this profile is formed by said refining bars and the grooves positioned between them.

The fiber suspension to be refined herein enters one of the two treatment gaps 11, 12 between the refining fillings via an inlet through the center of the device. The fibrous suspension then passes radially to the outside through the interacting treatment tools 1, 2, 3, 4 and accumulates in the adjacent annular space.

While at least a portion of the thus treated fibrous suspension leaves this annular space through a drain, the other portion of the fibrous suspension may, under certain circumstances, flow back through the grooves of the non-rotating treatment tools 1, 4 through a section of their length.

The cross-section of the refining bars, also referred to as knives, is generally rectangular, although there are other shapes. The upper side of these refining bars, in other words the surfaces supporting the refining edges, which conclude the respective refining filling in the direction of the mating filling, are positioned in the radial plane.

The grooves extending between the refining bars also have a rectangular cross-section and serve as flow channels for the fibrous suspension. The groove depth is usually between 2 and 20 mm.

Figure 2:
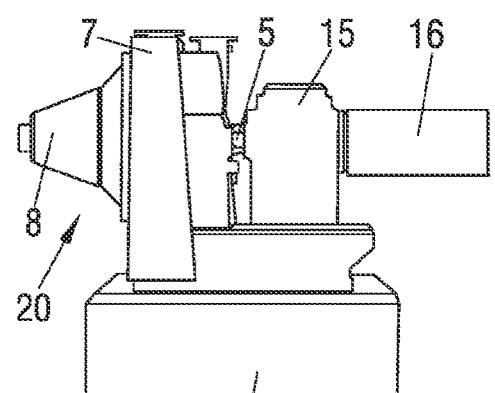
FIG. 2 is a side view of the closed refiner.

In the herein illustrated refining arrangement, treatment tool 2, 3 of both treatment gaps 11, 12 adjacent to the respective other treatment gap 11, 12 rotates with an axis 5 extending through the center of treatment profile 10. These rotating treatment tools 2, 3 are detachably mounted to a common base plate 14 which is axially movable on the rotating axis 5 and rotates with it. As can be seen in FIG. 2, axis 5 is driven by a drive 16 coupled via a gearbox 15.

Figure 1:
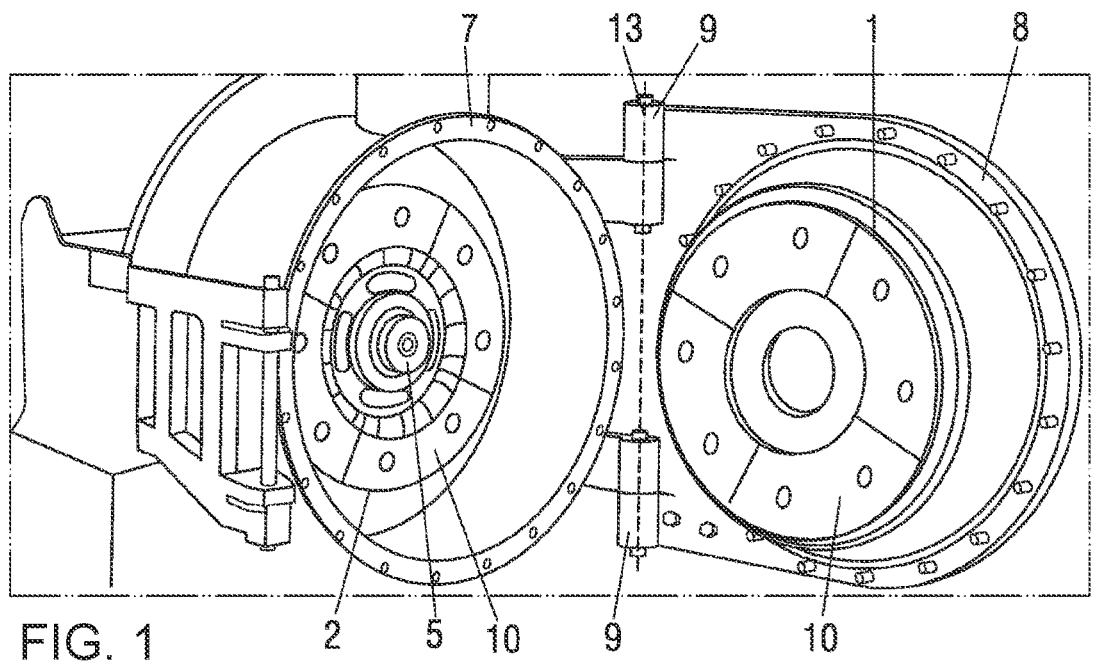
FIG. 1 is a double disc refiner in open condition.
Figure 3:
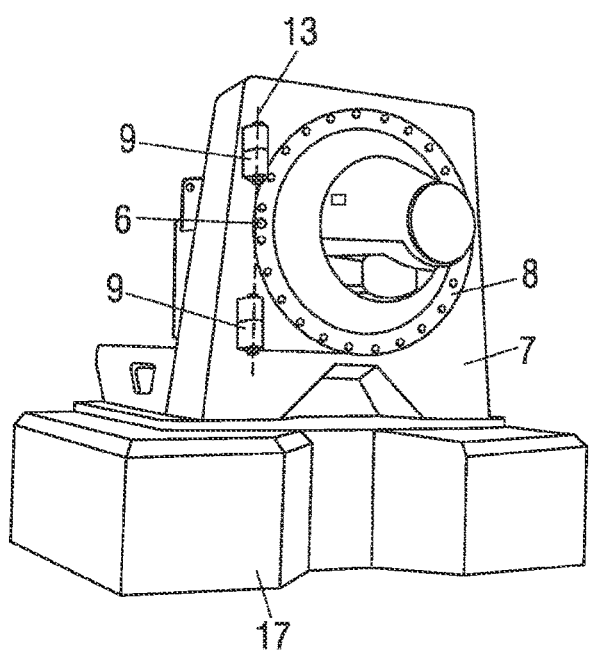
FIG. 3 is another side view of the closed refiner.

According to FIGS. 1 and 3, the housing of the device consists in particular of a large, fixed housing part 7 supported on a machine foundation 17 and a smaller housing part 8 in the embodiment of a cover which can be pivoted away from the latter.

These two housing parts 7, 8, each of which support a non-rotating treatment tool 1, 4, are coupled to each other via a joint 9, which is rotatable about joint axis 13 and is designed herein in two parts as an example.

Whereas non-rotating treatment tool 4 is firmly connected with stationary housing part 7, the other non-rotating treatment tool 1 can be moved axially along axis of rotation 5 via an adjustment device 18 for adjusting the overall width of both treatment gaps 11, 12.

Since base plate 14 is mounted in a floating manner on axis 5, its axial position is adjusted by the interaction of the hydraulic forces acting in the two treatment gaps 11, 12.

Depending on the flow rate as well as the wear of both treatment gaps 11, 12, the situation could occur that the width of treatment gaps 11, 12 differs, which can have a corresponding negative effect on the quality of the fiber treatment and wear.

Moreover, an increased friction value in the axially floating mounting of rotating base plate 14 (with its treatment tools 2, 3) on axis 5 could cause the rotor to not center itself.

The result may be an insufficiently large fiber suspension cushion in a treatment gap 11, 12 or even contact of the treatment tools 1, 2, 3, 4.

During contact of treatment tools 1, 2, 3, 4 of a treatment gap 11, 12, an exponential wear of treatment profile 10 of said treatment tools 1, 2, 3, 4 occurs over the duration of the contact.

In order to prevent this increased wear, the vibrations of the device are monitored via at least one sensor 6. Sensor 6 is designed as a uniaxial acceleration recorder with a piezoelectric measuring principle and is aligned parallel to axis 5.

Herein it has proved advantageous for reliable detection of a critical operating state that sensor 6 detects vibrations in the range between 5 and 12 kHz and thereby measures the vibration acceleration.

So that low-frequency basic vibrations of the environment can be considered in the evaluation of the signals of sensor 6, at least one further sensor detects vibrations in the area of gearbox 15.

For reliable measurement of vibrations in order to minimize wear in such devices for treatment of fibrous material, at least one sensor 6 is arranged in the housing near joint 9. Based on the higher demands, this region offers greater rigidity.

As shown in FIG. 3, sensor 6 is located in housing part 8—which can be swiveled away via joint 9—and approximately between the two door hinges of joint 9, whereby the straight line between sensor 6 and shaft 5 extends approximately perpendicular to joint axis 13.

A critical operating state of the device in terms of wear, in particular contact between treatment tools 1, 2, 3, 4 of a treatment gap 11, 12, can be concluded if the vibration intensity exceeds a previously determined vibration threshold value via sensor 6 of swiveling housing part 8.

Vibration signals are plotted in FIG. 5. To exclude false signals, particularly in the case of only very brief contact between treatment tools 1, 2, 3, 4, the control system of the device assumes that two treatment tools 1, 2, 3, 4 are in contact only if the specified vibration threshold value is exceeded at least once in each of at least three of five consecutive specified time intervals 25. Time intervals 28 impacted by vibrations, and discreet time intervals are shown. Measurement windows with respectively 5 time intervals are shown, wherein a malfunction with signaling occurs only in the middle measurement window, since only in this measurement window a minimum number of time intervals impacted by vibrations is detected.

FIG. 6 shows a diagram in which the vibration acceleration and, in comparison, the standard deviation of the vibration acceleration are plotted against time.

If the control system of the device—via this vibration measurement—detects a critical operating state for treatment tools 1, 2, 3, 4, the axial position of non-rotating treatment tool 1 that is supported by swiveling housing part 8 is adjusted accordingly by adjusting device 18 in order to widen treatment gap 11, 12.

The present invention can also be used with conical refining surfaces, where the cone axis coincides with the axis of rotation 5, and with devices having only one treatment gap.

In summary, the present invention relates to a device and a method for fiber treatment. The device has a multi-part housing in which at least a first treatment tool (1, 3) and a second treatment tool (2, 4) are arranged. Treatment tools (1, 2, 3, 4) have a rotationally symmetrical shape and are arranged coaxially to one another and can be rotated relative to one another about a common axis (5). Two treatment tools (1, 2, 3, 4) respectively define a treatment gap (11, 12) through which the fibrous material flows radially. Two housing parts (7, 8), each supporting at least one treatment tool (1, 2, 3, 4), are connected with one another via a joint (9) which can rotate about a joint axis (13). Contact between two treatment tools (1, 2, 3, 4) is reliably detected by at least one sensor (6) arranged on the housing, optionally an externally arranged sensor (6) for detecting vibrations.

COMPONENT IDENTIFICATION LISTING

1 Non-rotating treatment tool, axially adjustable
2 treatment tool, flat and rotating
3 treatment tool, flat and rotating
4 non-rotating treatment tool 5 axis of rotation
6 sensor
7 housing part, fixed
8 housing part, cover
9 joint, hinge
10 treatment profile
11 treatment gap
12 treatment gap
13 joint axis
14 base plate
15 gearbox
16 drive
17 machine foundation
18 adjustment device
20 device
21 vibration acceleration
22 standard deviation of vibration acceleration
25 malfunction, clash
26 time interval
27 time interval, normal operation
28 time interval impacted by vibration While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for treating a web of fibrous material, the device comprising:
    a sensor for detecting a plurality of vibrations;
    a multi-part housing including a cover;
    a plurality of fiber treatment tools arranged inside the multi-part housing, the plurality of fiber treatment tools including a plurality of treatment profiles facing one another, being arranged spaced apart from each other so as to form at least one treatment gap with the plurality of treatment profiles, and being mounted rotatably relative to one another, at least one of the plurality of fiber treatment tools being mounted axially movable in the multi-part housing so as to be configured for adjusting a width of the at least one treatment gap between the plurality of treatment profiles facing each other, at least one of the plurality of fiber treatment tools being supported by a part of the multi-part housing, the sensor being arranged on the multi-part housing; and
    a control unit including an evaluation device configured for detecting a malfunction when a predetermined number of time intervals of a predetermined duration which are impacted by the plurality of vibrations are exceeded, wherein at least half of the predetermined number of time intervals are impacted by the plurality of vibrations.

2. The device according to claim 1, wherein the multi-part housing includes an outside, the sensor being arranged on the outside of the multi-part housing.

3. The device according to claim 1, wherein the sensor for detecting the plurality of vibrations is formed by a uniaxial acceleration recorder.

4. The device according to claim 3, wherein the sensor formed as the uniaxial acceleration recorder is aligned for detecting in a direction of the width of the at least one treatment gap.

5. The device according to claim 1, further comprising at least two hinges, wherein the cover is rotatably mounted about a joint axis by way of the at least two hinges, the sensor being arranged in a region of the device between the at least two hinges on the multi-part housing, the region between the at least two hinges being limited by planes extending perpendicular relative to the joint axis.

6. The device according to claim 5, wherein the sensor is arranged in the region of the device between the at least two hinges on the cover.

7. The device according to claim 5, wherein the joint axis is vertically extending.

8. The device according to claim 5, wherein the cover includes a hinge-side half, the sensor being arranged on the hinge-side half of the cover.

9. The device according to claim 1, further comprising a high-pass filter of at least 4000 HZ, the high-pass filter being configured for signal processing of a plurality of signals of the sensor.

10. The device according to claim 1, wherein the control unit further comprises a memory configured for storing a plurality of standard deviations.

11. The device according to claim 10, wherein at least three of five of the predetermined number of time intervals are impacted by the plurality of vibrations.

12. The device according to claim 10, wherein the predetermined duration of a respective one of the predetermined number of time intervals is at least 2 seconds.

13. The device according to claim 10, wherein the predetermined duration of the predetermined number of time intervals is the same.

14. A method for detecting a malfunction, the method comprising the steps of:
    providing a device for treating a web of fibrous material according to claim 1;
    detecting a vibration acceleration using the sensor;
    filtering a plurality of vibration signals, corresponding to the plurality of vibrations, by way of a high-pass filter of the device;
    determining, upon detecting a predetermined vibration threshold value being exceeded, the vibration acceleration over a predetermined number of time intervals which are predetermined; and
    signaling a malfunction if the predetermined vibration threshold value is exceeded in at least half of the time intervals which are consecutive.

15. The method according to claim 14, wherein the time intervals comprise at least five time intervals, and wherein the step of signaling the malfunction occurs if the predetermined vibration threshold value is exceeded in at least three of the five time intervals which are consecutive.

16. The method according to claim 14, wherein a measurement occurs over a respective one of the time intervals of at least 2 seconds.

17. The method according to claim 14, wherein a determination of a standard deviation from a plurality of recorded vibration acceleration signals is continuously conducted for a determination of a vibration intensity, and the standard deviation is used for a detection of the malfunction.

18. The method according to claim 14, wherein, following each one of a start-up, a basic value of a plurality of operation-related vibrations is taught to eliminate a plurality of basic vibrations caused by an environment.

19. The method according to claim 14, wherein an axial position of at least one treatment tool of a housing part is adjusted in order to widen at least one treatment gap when the malfunction is detected.

* * * * *